(12) United States Patent
Baron

(10) Patent No.: US 6,371,492 B1
(45) Date of Patent: Apr. 16, 2002

(54) GASKET, IN PARTICULAR, FOR MOTOR VEHICLES

(75) Inventor: Ralf Baron, Metzingen (DE)

(73) Assignee: Elring Klinger GmbH, Dettigen (DE)

( * ) Notice: Subject to any disclaimer, the term of this patent is extended or adjusted under 35 U.S.C. 154(b) by 0 days.

(21) Appl. No.: 09/313,887

(22) Filed: May 18, 1999

(30) Foreign Application Priority Data

May 20, 1998 (DE) ..................... 298 09 130 U

(51) Int. Cl.$^7$ ............................................. F16J 15/34
(52) U.S. Cl. .................... 277/637; 277/630; 411/512
(58) Field of Search ........................... 277/630, 637, 277/598, 616; 411/525, 526, 527, 437

(56) References Cited

U.S. PATENT DOCUMENTS

| | | | | |
|---|---|---|---|---|
| 2,117,775 A | * | 3/1938 | Tinnerman | 411/527 X |
| 2,221,498 A | * | 11/1940 | Tinnerman | 411/527 |
| 5,513,855 A | * | 5/1996 | Yasui | 277/630 X |
| 5,544,902 A | | 8/1996 | Belter | 277/236 |
| 5,673,920 A | | 10/1997 | Mockenhaupt | 277/9.5 |
| 5,707,193 A | * | 1/1998 | Hasegawa | 411/527 X |

FOREIGN PATENT DOCUMENTS

| | | |
|---|---|---|
| DE | 8708965 | 12/1988 |
| EP | 0294084 | 12/1988 |

* cited by examiner

*Primary Examiner*—Lynne H. Browne
*Assistant Examiner*—John R. Cottingham

(57) ABSTRACT

Gasket with at least one sheet-metal layer which has at least one screw hole for the passage of the threaded shaft of a screw, wherein for a secure holding against loss of the screw in the screw hole the sheet-metal layer is designed such that several holding tongues integral with the sheet-metal layer project from the edge of the screw hole, define a circular core hole, the diameter of which corresponds to the core diameter of the screw thread, and are designed for engagement in the screw thread, and that at least some of the holding tongues are bent out of the plane of the sheet-metal layer in such a manner that the edge regions of the holding tongues facing the center of the hole are arranged so as to be offset relative to one another in axial direction of the screw hole in accordance with the pitch of the screw thread.

16 Claims, 2 Drawing Sheets

GASKET, IN PARTICULAR, FOR MOTOR VEHICLES

The invention relates to a gasket, in particular, a gasket for a motor vehicle component which has at least one sheet-metal layer which has at least one screw hole for the passage of the threaded shaft of a screw.

Vehicle manufacturers require from their suppliers to an ever increasing extent that the latter supply structural parts together with associated components in a preassembled state; however, even when a supplier supplies a structural part without associated components, the latter are often already fitted to the structural part in the works of the vehicle manufacturer before this part is brought to the assembly line for assembly.

Assembly screws are customarily part of a gasket, in particular, flat gaskets, and during the course of the endeavors described above it is required that the gasket be supplied to the assembly line together with assembly screws, wherein the screws are intended to be held on the gasket in a manner secured against loss.

Means for securing screws against loss are known in various designs; for example, DE-U-87 08 965 discloses a cap screw with a washer which is produced from an elastic plastics material and has a screw hole for the passage of the threaded shaft of the cap screw as well as a means for securing the cap screw against loss in order to hold the latter on the washer. Four holding tongues, which are all located in a plane common to the holding tongues prior to the insertion of the cap screw into the screw hole of the washer, are integrally formed at the edge of the screw hole of the plastic washer, and the cap screw has between its head and its threaded shaft an annular groove, into which the holding tongues engage once the threaded shaft has been pushed through the screw hole of the washer under elastic deflection of the holding tongues.

Modern gaskets for motor vehicles often have a metallic gasket plate consisting of one or several sheet-metal layers which are coated, where applicable, over the entire surface or partially with a mostly elastomeric coating material, and the object underlying the invention was to provide a means for securing screws against loss for a gasket with at least one sheet-metal layer, wherein the means for securing against loss is intended to be simple to produce and not lead to complications during the assembly.

Proceeding from a gasket having at least one sheet-metal layer which has at least one screw hole for the passage of the threaded shaft of a screw, this object may be accomplished in accordance with the invention in that several holding tongues which are integral with the sheet-metal layer and are distributed over the hole circumference and arranged at a distance from one another project from the edge of the screw hole, that the edge regions of the holding tongues facing the center of the hole—when seen in axial direction of the screw hole—define a circular core hole, the diameter of which corresponds to the core diameter of the screw thread, that the width of the holding tongues as well as the thickness of the sheet-metal layer make the engagement of the holding tongues in the screw thread possible at least in the edge regions of the holding tongues facing the center of the hole, and that at least some of the holding tongues are bent out of the plane of the sheet-metal layer in such a manner that the edge regions of the holding tongues facing the center of the hole are arranged so as to be offset in relation to one another in axial direction of the screw hole in accordance with the pitch of the screw thread.

Holding tongues designed in this manner may be punched out as well as bent with a punching-bending tool during the production of the screw hole, where applicable even during the course of punching out the sheet-metal layer with simultaneous production of the screw hole, wherein the tool can, of course, be designed such that the sheet-metal layer falls of its own accord out of the tool following the punching-bending procedure. If the sheet-metal layer originally has a sheet-metal thickness which would not allow the holding tongues to engage in the screw thread, the sheet-metal thickness of the edge regions of the holding tongues facing the center of the hole can also be easily reduced with the tool by way of stamping such that these edge regions can then engage in the screw thread. In contrast to a means for securing against loss, with which all the holding tongues or rather their edge regions facing the center of the hole are all located in one and the same plane so that only one of the holding tongues can engage in the screw thread when the screw is inserted into the screw hole without any deformation of the holding tongues, the inventive means for securing against loss makes it possible for all the holding tongues to engage in the screw thread, the screw to be held on the gasket in a manner really secure against loss, namely with the screw axis running at right angles to the plane of the sheet-metal layer, and for the screw to be centered in the screw hole—this represents a quite considerable advantage for the later assembly. Moreover, the inventive means for securing against loss also leads to the following, additional advantages: If the screw is turned during its insertion into the gasket, no expenditure of force whatsoever is required; the elastically deflectable holding tongues also, however, allow the screw to be easily inserted into the screw hole without turning it whereas any screwing back of the screw is not possible or only with a relatively high expenditure of force.

In principle, it would be possible to bend the holding tongue or the holding tongues to be bent out of the plane of the sheet-metal layer such that it extends or they extend at an angle to the plane of the sheet-metal layer. However, embodiments are preferred, with which each holding tongue bent out of the plane of the sheet-metal layer is bent at an angle not only in the area of its base but also close to its edge region facing the center of the hole in such a manner that the edge region extends at least approximately parallel to the plane of the sheet-metal layer since, in this case, the edge regions of all the holding tongues close to the center are located at right angles in the screw thread.

The inventive means for securing against loss is of a particularly simple design when one of the holding tongues is flat and located in the plane of the sheet-metal layer since, in this case, only the second or all the other holding tongues has or have to be bent out of the sheet-metal layer.

A particularly effective means for securing against loss and a particularly good centering of the screw result when the edge regions of the holding tongues facing the center of the hole have a contour in the shape of a circular arc corresponding to the core hole although embodiments are, of course, also conceivable, with which the edge regions of the holding tongues facing the center of the hole have, for example, a triangular or convexly semicircular contour.

So that the holding tongues can engage well in the screw thread without them having to be deformed during the insertion of the screw into the screw hole, the edge regions of the holding tongues facing the center of the hole ought to be relatively narrow, for which reason embodiments with more than two holding tongues are preferred with respect to the desired centering of the screw in the screw hole, particularly embodiments with three holding tongues arranged at equal angular distances from one another.

Finally, it is recommended to design the inventive means for securing against loss such that the holding tongue or holding tongues bent out of the plane of the sheet-metal layer projects or project from the sheet-metal layer in assembly direction of the screw since, in this case, no overly considerable expenditure of force is required in order to be able to insert the screw into the screw hole without turning it, namely in the direction, in which the holding tongues have been bent out of the sheet-metal layer.

Additional features, advantages and details of the invention result from the attached drawings and the following description of a particularly advantageous embodiment of the inventive means for securing a gasket against loss; in the drawings:

FIG. 1 shows a section of a gasket 10, the gasket plate 12 of which is formed by a single sheet-metal layer which can be coated with an, in particular, elastomeric sealing mass on one or both sides over the entire surface or partially.

Figure 1:
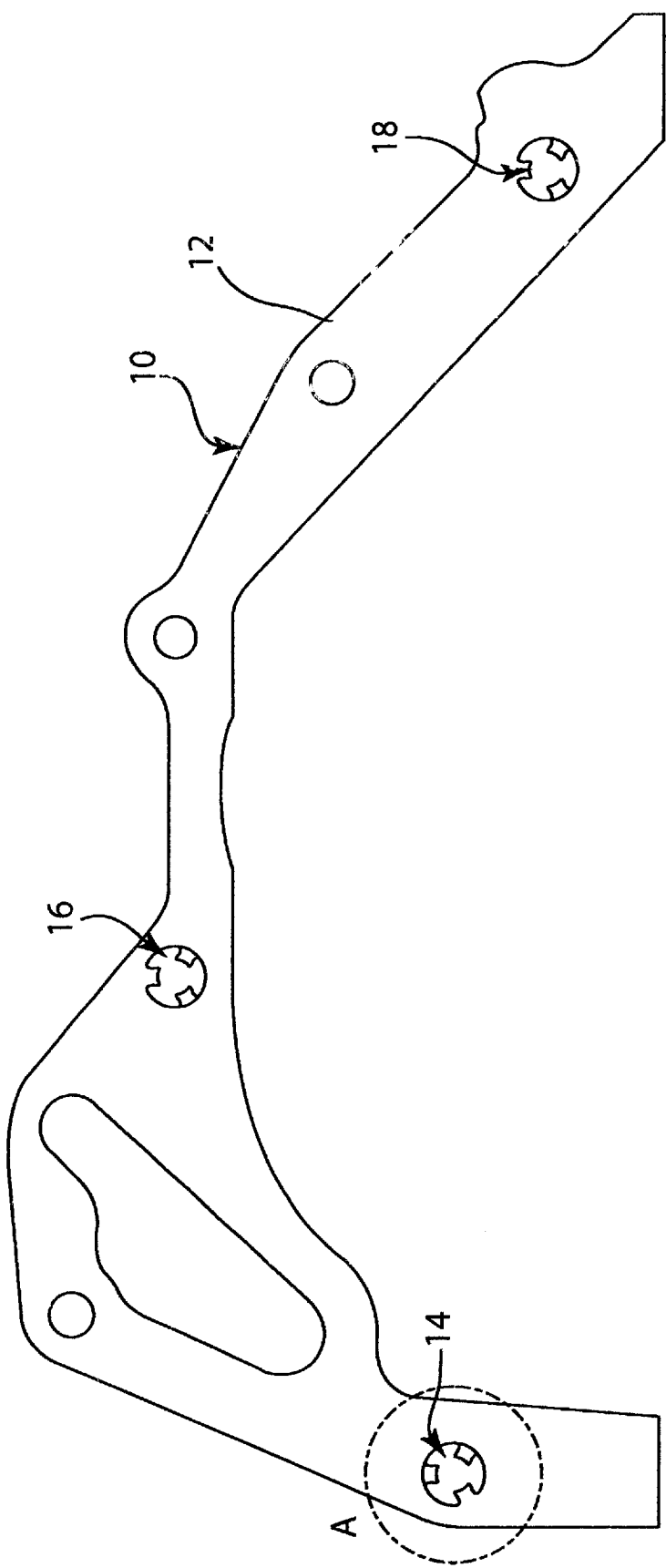
FIG. 1 shows a plan view of a section of an inventive gasket with several screw holes, of which three are provided with an inventive means for securing against loss.

In the section of the gasket 10 illustrated in FIG. 1, the gasket plate 12 has three screw holes 14, 16, 18 provided with inventive means for securing against loss for the passage of the threaded shafts of cap screws which are not illustrated.

Figure 2:
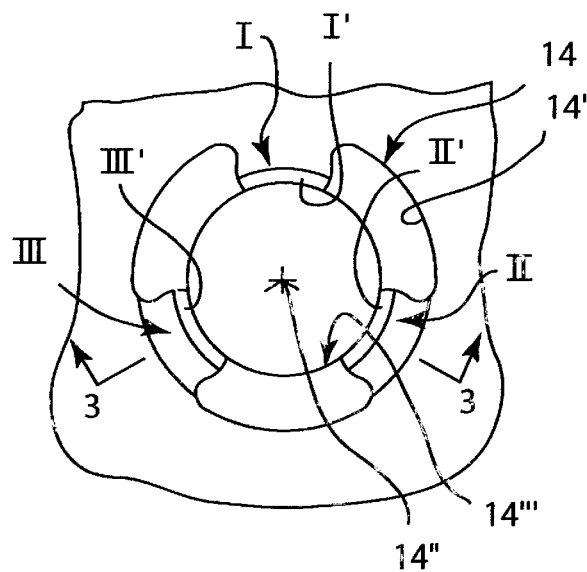
FIG. 2 shows the detail A from FIG. 1 on a larger scale.

The screw holes can all be of an identical design, and the configuration of the means for securing against loss which is provided at the screw hole 14 will now be described in greater detail on the basis of FIGS. 2 to 4.

The screw hole 14 has an edge 141 which is formed by several circular arc segments and defines a circle with a diameter which is equal to the diameter of conventionally designed screw holes in gasket plates. Three holding tongues I, II, III project from the edge 14' of the screw hole inwards, i.e. in the direction towards a center 14" of the hole; these holding tongues are arranged at equal angular distances from one another and are formed by the sheet metal of the gasket plate 12. Inner edge regions of the holding tongues I to III facing the center 14" of the hole have been designated as I', II' and III'; the rims of these inner edge regions facing the center 14" of the hole are likewise shaped like a circular arc and define a circular core hole 14'" concentric to the center 14" of the hole, the diameter of this core hole being only very slightly greater than the core diameter of the thread of the cap screw to be held.

Figure 3:
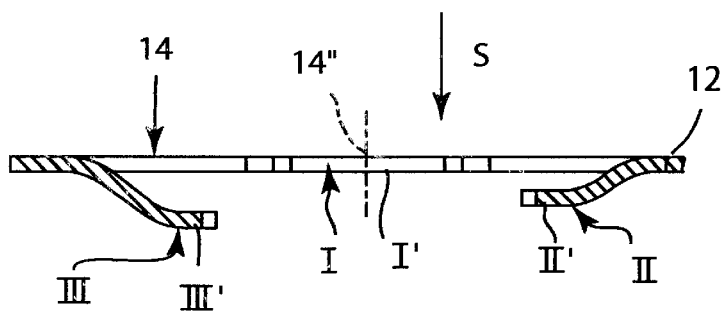
FIG. 3 shows a section according to line 3—3 in FIG. 2.
Figure 4:
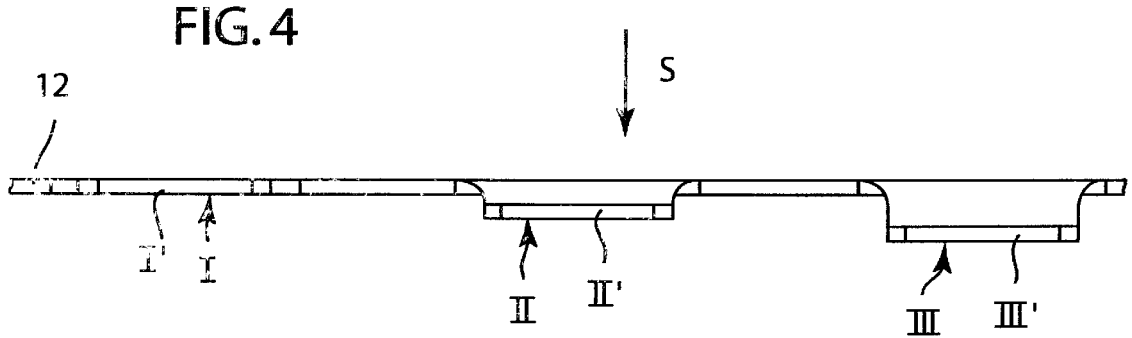
FIG. 4 shows the layout of the section illustrated in FIG. 3.

As is apparent from FIGS. 3 and 4, the holding tongue I is flat and located in the plane of the gasket plate, whereas the holding tongues II and III have been bent out of the plane of the gasket plate, namely in the direction of the arrow S illustrated in FIG. 3 which also specifies the direction, in which the cap screw to be held is to be inserted into the screw hole 14.

Each of the holding tongues II and III is bent at an obtuse angle not only in the region of its base but also at the radially outer end of its inner edge region II' and III', respectively, such that a cross section in the shape of a somewhat flattened Z results. The inner edge regions II' and III' extend parallel to the plane of the gasket plate 12 but at such different distances from the actual gasket plate (measured in the direction of the arrow S) that the inner edge regions I', II' and III' (in consideration of their angular distances from one another) are arranged so as to be offset relative to one another in the direction of the arrow S in accordance with the pitch of the screw thread.

The width of the holding tongues I to III measured in circumferential direction of the screw hole 14 has been selected, taking into consideration the sheet-metal thickness of the gasket plate 12, such that the inner edge regions I', II' and III' can engage in the thread or rather the threads of the screw to be held such that at least no appreciable deformation of the holding tongues I to III thereby occurs.

If a screw is introduced into the screw hole 14 in the direction of the arrow S and thereby not turned, the holding tongues I, II and III will be elastically deflected in the direction of the arrow S and then spring back into the thread or rather the threads. Since the holding tongues II and III project at an angle from the actual gasket plate 12 and both have been bent out of the plane of the gasket plate in the direction of the arrow S, the screw may, however, no longer be drawn out of the screw hole 14 or only with considerable expenditure of force or be pressed back contrary to the arrow S.

Above all when the holding tongues I, II, III are designed such that they engage in the screw thread not only over a very small circumferential angle, a modification of the embodiment of the inventive means for securing against loss illustrated in the drawings may be recommendable; in this modification, the edge regions I', II' and III' of the holding tongues facing the center 14" of the hole do not extend parallel to the plane of the sheet-metal layer 12, as illustrated in FIGS. 3 and 4, but are inclined towards this plane in accordance with the pitch of the screw thread. As a result, it is possible to avoid the inventive means for securing against loss from leading, during the assembly of the gasket, i.e. during the tightening of the screws, to an increase in the torque required for this purpose because the holding tongues engaging in the screw thread fit closely onto the flanks of the thread. Moreover, holding tongues with edge regions extending at an angle in this manner may likewise be produced quite easily by means of a punching-bending tool.

What is claimed is:

1. Gasket for a motor vehicle component, said gasket having at least one sheet-metal layer defining a plane of said layer and having at least one screw hole for the passage of a threaded shaft of a screw having a screw axis and a thread defining a thread pitch, wherein said sheet-metal layer is provided with means for securing said threaded shaft in said screw hole with said screw axis extending perpendicularly to the plane of the sheet-metal layer so as to secure said screw against loss, said securing means comprising several holding tongues integral with the sheet-metal layer and projecting from the edge of the screw hole, said tongues being distributed over the circumference of the screw hole and arranged at a distance from one another, said holding tongues having edge regions facing the center of the hole and defining, when seen in axial direction of the screw hole, a circular core hole having a diameter corresponding to the core diameter of the screw thread, the width of the holding tongues as well as the thickness of the sheet-metal layer enabling at least the edge regions of the holding tongues facing the center of the hole to engage in the screw thread, at least some of the holding tongues being bent out of the plane of the sheet-metal layer in such a manner that the edge regions of the holding tongues facing the center of the hole are arranged so as to be offset in relation to one another in the axial direction of the screw hole in accordance with said thread pitch, said edge regions of the holding tongues being elastically deflectable in the axial direction of the screw hole to such an extent that said threaded shaft can be inserted into the screw hole without turning of the screw shaft.

2. Gasket as defined in claim 1, wherein each holding tongue bent out of the plane of the sheet-metal layer is bent at an angle not only in the area of a base of the holding tongue but also close to the edge region of the holding tongue facing the center of the hole in such a manner that the edge region extends at least approximately parallel to the plane of the sheet-metal layer.

3. Gasket as defined in claim 1 wherein one of the holding tongues is flat and located in the plane of the sheet-metal layer.

4. Gasket as defined in claim 1, wherein the edge regions of the holding tongues facing the center of the hole have a contour in the shape of a circular arc corresponding to the core hole.

5. Gasket as defined in claim 1, wherein the holding tongues are arranged at equal angular distances from one another.

6. Gasket as defined in claim 1, wherein three holding tongues are provided.

7. Gasket as defined in claim 1, wherein the holding tongues bent out of the plane of the sheet-metal layer project in the same direction from the sheet-metal layer.

8. Gasket as defined in claim 1, wherein the edge regions of the holding tongues facing the center of the hole are inclined towards the plane of the sheet-metal layer in accordance with said thread pitch.

9. Gasket with at least one sheet-metal layer, said at least one sheet-metal layer defining a plane of said layer and having at least one screw hole for a passage of a threaded shaft of a screw having a screw axis and a thread defining a thread pitch, wherein said sheet-metal layer is provided with means for securing said threaded shaft in said screw hole with said screw axis extending perpendicularly to the plane of the sheet-metal layer so as to secure said screw against loss, said securing means comprising several holding tongues integral with the sheet-metal layer and projecting from the edge of the screw hole, said tongues being distributed over the circumference of the screw hole and arranged at a distance from one another, said holding tongues having edge regions facing the center of the hole and defining, when seen in axial direction of the screw hole, a circular core hole having a diameter corresponding to the core diameter of the screw thread, the width of the holding tongues as well as the thickness of the sheet-metal layer enabling at least the edge regions of the holding tongues facing the center of the hole to engage in the screw thread, at least some of the holding tongues being bent out of the plane of the sheet-metal layer in such a manner that the edge regions of the holding tongues facing the center of the hole are arranged so as to be offset in relation to one another in the axial direction of the screw hole in accordance with said thread pitch, and wherein one of the holding tongues is flat and located in the plane of the sheet-metal layer.

10. Gasket as defined in claim 9, wherein said edge regions of the holding tongues are elastically deflectable in the axial direction of the screw hole.

11. Gasket as defined in claim 9, wherein, in the circumferential direction of the screw hole, said edge regions of the holding tongues are arranged at a distance from one another, said distance being greater than the width of said edge regions.

12. Gasket as defined in claim 9, wherein each holding tongue bent out of the plane of the sheet-metal layer is bent at an angle not only in the area of a base of the holding tongue but also close to the edge region of the holding tongue facing the center of the hole in such a manner that the edge region extends at least approximately parallel to the plane of the sheet-metal layer.

13. Gasket as defined in claim 9, wherein the edge regions of the holding tongues facing the center of the hole have a contour in the shape of a circular arc corresponding to the core hole.

14. Gasket as defined in claim 9, wherein the holding tongues are arranged at equal angular distances from one another.

15. Gasket as defined in claim 9, wherein three holding tongues are provided.

16. Gasket as defined in claim 9, wherein the holding tongues bent out of the plane of the sheet-metal layer project in the same direction from the sheet-metal layer.

* * * * *

UNITED STATES PATENT AND TRADEMARK OFFICE
CERTIFICATE OF CORRECTION

PATENT NO.     : 6,371,492 B1
DATED          : April 16, 2002
INVENTOR(S)    : Ralf Baron et al.

It is certified that error appears in the above-identified patent and that said Letters Patent is hereby corrected as shown below:

<u>Column 4,</u>
Line 2, replace "defletable" with -- deflectable --.

Signed and Sealed this

Second Day of July, 2002

Attest:

JAMES E. ROGAN
Attesting Officer                    Director of the United States Patent and Trademark Office